Feb. 27, 1951 C. S. ASH 2,543,346
VEHICLE WHEEL
Filed July 6, 1946 2 Sheets-Sheet 1
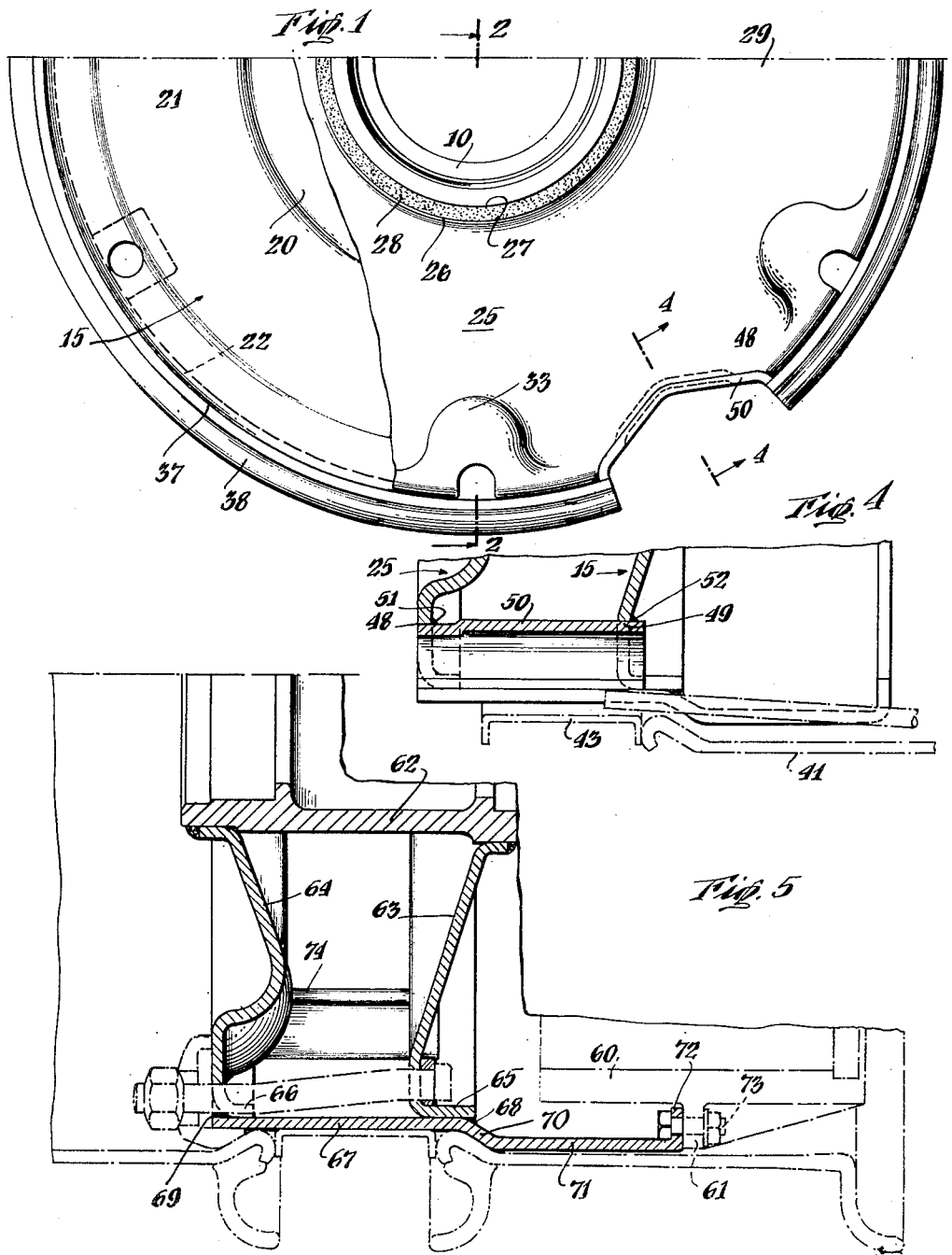
INVENTOR
Charles S. Ash
BY
Morgan, Finnegan & Durham
ATTORNEYS Feb. 27, 1951 — C. S. ASH — 2,543,346
VEHICLE WHEEL
Filed July 6, 1946 — 2 Sheets-Sheet 2
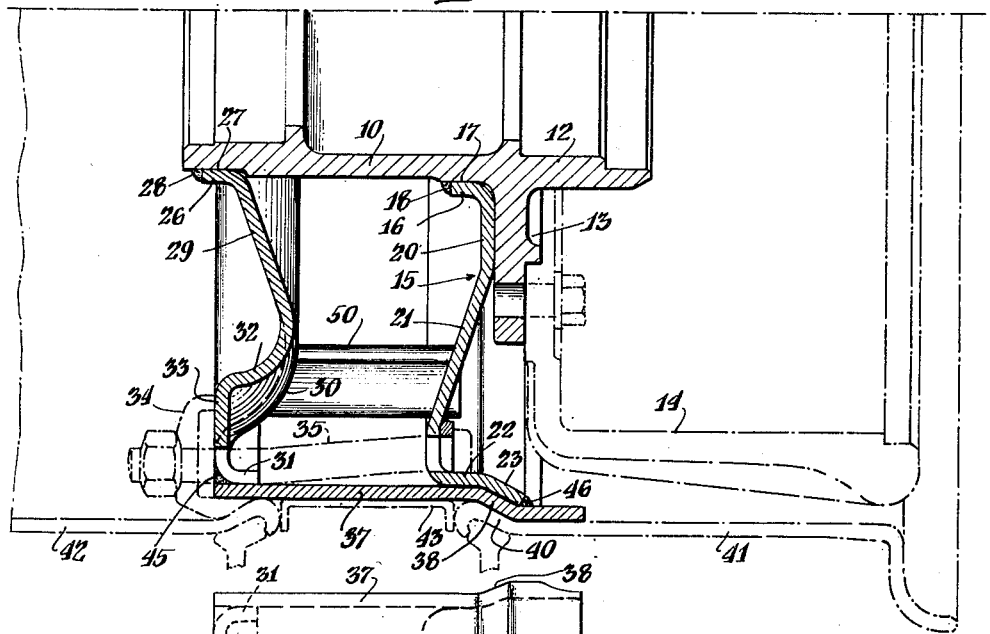
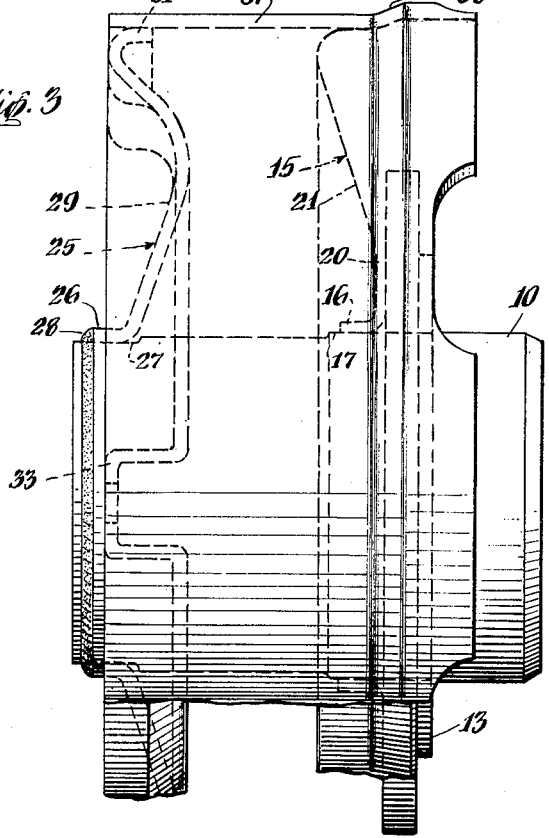
INVENTOR
Charles S. Ash
BY
Morgan, Finnegan & Durham
ATTORNEYS Patented Feb. 27, 1951

2,543,346

UNITED STATES PATENT OFFICE 2,543,346

VEHICLE WHEEL

Charles S. Ash, Milford, Mich.

Application July 6, 1946, Serial No. 681,668

4 Claims. (Cl. 301—13)

The present invention relates to vehicle wheels and more particularly to such wheels adapted to demountably carry a pair of road engaging elements.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawings, referred to herein and constituting a part hereof, illustrate one embodiment of the invention, and together with the description, serve to explain the principles of the invention.

Of the drawings:

Figure 1 is a partial end elevational view of a typical and illustrative embodiment of the present invention looking inwardly of the wheel, certain parts being broken away for greater clarity;

Figure 2 is a cross-sectional view taken along line 2—2 of Figure 1;

Figure 3 is a partial side elevational view of the embodiment of the invention shown in Figures 1 and 2;

Figure 4 is a sectional view taken along line 4—4 of Figure 1; and

Figure 5 is a cross-sectional view of a modified embodiment of the present invention.

The present invention has for an object the provision of an improved vehicle wheel of the type adapted to demountably mount a pair of pneumatic tire rims. A further object is the provision of a wheel of the type just mentioned which is economical to build both in labor and materials, and is well adapted for the heaviest duty uses such as, for instance, on trucks, trailers and busses.

Referring now in detail to the illustrative embodiments of the invention shown by way of example in the accompanying drawings, and referring first to the embodiment of Figures 1 to 4 inclusive, the vehicle wheel comprises a tubular hub 10 having internal finished surfaces 11 and 12 for the reception of suitable anti-friction bearings whereby the wheel may be mounted at the end of a vehicle axle. Adjacent the inner end of hub 10 there is provided an integral outwardly radial extending flange 13 to which may be secured a conventional vehicle wheel brake drum shown in dotted lines and designated with the numeral 14.

The central body portion of the composite vehicle wheel of the invention comprises a pair of radially extending disc or web members secured to the hub 10 in axially spaced apart relationship which carry on their outer peripheries a cylindrical connecting band to serve the dual purposes of securing the webs together thereby strengthening the wheel, and also mounting a pair of pneumatic tire rims. As best shown in Figure 2 of the drawings, the axially inner web is designated generally by the numeral 15 and is formed at its inner periphery with an integral, axially outwardly turned cylindrical portion 16. The short cylindrical portion 16 of the web is adapted to seat on an external finished cylindrical surface 17 of the hub 10 adjacent flange 13 and is preferably press fitted thereon in assembling the wheel. The hub 10 and web 15 are securely joined by a circular weld 18 at the outer end of cylindrical portion 16.

Immediately radially outwardly of cylindrical portion 16 the inner web 15 is formed with a plane portion 20 which is substantially normal to the axis of the hub and is adapted to abut the outer surface of hub flange 13. The plane portion 20 of the web merges radially outwardly into an outwardly inclined frusto-conical portion 21, and at its outer periphery this portion of the web is axially inwardly turned in an integral cylindrical portion 22 which terminates in a radially outwardly flared or inclined portion 23.

The axially outer web member 25 of the composite wheel structure is formed similarly to the inner web 15 with an integral inner peripheral cylindrical portion 26 which is adapted to be press fitted upon a finished external cylindrical surface 27 at the outer end of hub 10. The outer web and hub are securely joined by a circular weld 28 adjacent the outer end of the hub.

Radially outwardly of its cylindrical portion 26 the outer web 25 is formed in a central frusto-conical portion 29 which is oppositely inclined to the frusto-conical portion 21 of the inner web 15. Portion 29 of the outer web merges radially outwardly into an oppositely turned, curved portion 30 of the web and this is abruptly oppositely turned at its outer periphery to provide a relatively short cylindrical peripheral portion 31. At circumferentially spaced intervals about the web 25 curved portion 30 is more abruptly axially outwardly turned in portions 32 each of which terminates radially outwardly in a plane portion 33.

The plane portions 33 of the outer web 25 serve as seats to receive the lower prongs of a plurality of conventional rim mounting lugs 34 shown in dotted lines in Fig. 2 of the drawings. Lugs 34 are adapted to be received over the ends of mounting bolts 35 which extend through suitable apertures in the inner and outer webs 15 and 25 respectively as shown and cooperate with the lugs to demountably mount pneumatic tire rims on the wheel. Bolts 35 further serve to strengthen the wheel structure by interconnecting webs 15 and 25 when the rims are in position and tightened. Webs 15 and 25 are preferably conveniently and economically formed of single blanks of material stamped or drawn into their final shapes for assembly in the wheel.

Means are provided for demountably mounting a pair of tire rims on the wheel structure comprising the hub and web members 15 and 25. As shown there is provided a cylindrical element 37 which extends axially over the outer peripheries of webs 15 and 25 and seats on the cylindrical portions 22 and 31 respectively of the webs. At its axially inner end the cylindrical element 37 is formed with a flared or inclined portion 38 to abut inclined portion 33 of the inner web.

The inclined portion 38 of the cylindrical element serves as a seat to receive the turned edge or bead 40 of an inner pneumatic tire rim 41 for the wheel, and an outer duplicate tire rim 42 is received over the outer end of element 37 and is seated on inclined surfaces provided for the purpose on lugs 34. A cylindrical spacing ring 43 is provided between rims 41 and 42 cooperating with inclined portion 38 and lugs 34 to securely and demountably position the tire rims on the wheel. The cylindrical mounting element 37 is joined to the outer web by welding 45 and to the inner web by welding 46.

As best shown in Figures 1 and 2 of the drawings, the webs 15 and 25 and element 37 are formed with access openings to accommodate the valve stems of the inner and outer tires. At a position between a pair of the lug seating plane portions 33 the outer web 25 is relieved or notched as indicated at 48 and the inner web 15 is relieved or notched at 49 at a corresponding position. A curved axially extending plate 50 is positioned in these notched places and is welded to the outer and inner webs at 51 and 52 respectively. The cylindrical element 37 is slotted throughout its width, as shown in Figure 1, over plate 50 to allow assembly of the rims with valve stems, and driving lugs may, if desired, be provided on the rims to seat against the edges of the slotted cylindrical element.

The embodiment of the invention shown in Figure 5 of the drawings is in general similar to the embodiment of Figures 1 to 4 inclusive just described, except that the wheel is adapted to carry a band type of brake drum 60 which is secured to the wheel by means of a central flange 61 in order to prevent bell mouthing when the drum is heated in use. As shown, this embodiment of the invention comprises a tubular hub 62 with an inner radially extending web member 63 and an outer radially extending web member 64 press fitted on finished external surfaces thereof and welded thereto.

The inner web 63 extends radially outwardly in a frusto-conical portion terminating at its outer periphery in a short inwardly axially turned cylindrical portion 65. The outer web member 64 is entirely similarly formed to the embodiment of the invention in Figures 1 to 3 inclusive already described, and terminates at its outer periphery in a short cylindrical portion 66. Cylindrical portions 65 and 66 of the respective webs receive a cylindrical, axially extending rim mounting element 67 which is welded thereto as indicated at 68 and 69. In this embodiment of the invention cylindrical member 67 is formed in a flared or inclined portion 70 to serve as a seat for the inner rim, and extends axially inwardly therefrom in a cylindrical extension 71 which is provided at its end with an inwardly turned flange 72 to abut flange 61 of the band type brake drum 60. The brake drum thus may be securely and detachably secured to the wheel by means of mounting bolts 73.

As in the embodiment of Figures 1 to 4 inclusive already described, the webs 63 and 64 are preferably notched between a pair of the lug seating surfaces to provide access for valve stems of the inner and outer tires, and an axially extending plate 74 is secured to each web in order to close the interior of the wheel. The cylindrical member 67 is slotted throughout its width over plate 74, similarly to the element 37 in the first embodiment of the invention and for the same reasons.

The invention in its broader aspects is not limited to the specific mechanisms shown and described but departures may be made therefrom within the scope of the accompanying claims without departing from the principles of the invention and without sacrificing its chief advantages.

What is claimed is:

1. A vehicle wheel comprising, in combination, a tubular hub, a pair of pressed, annular web members having axially turned cylindrical portions at their inner peripheries seated on said hub and welded thereto in spaced apart relationship said webs being spaced apart throughout their radial extents, the inner web having frusto-conically formed throughout the major portion of its radial extent said frusto-conical formation inclining axially outwardly and terminating in an outer peripheral, abruptly, axially inwardly turned cylindrical portion, the outer web being frusto-conically formed throughout the major portion of its radial extent said frusto-conical formation inclining axially inwardly and merging into an axially outwardly turned annular portion adjacent the outer periphery said portion terminating in an abruptly axially inwardly turned outer peripheral cylindrical portion, and a substantially cylindrical element seated on said outer peripheral cylindrical portions and welded thereto, said element having an axially outer cylindrical surface and being flared to provide an axially inner inclined surface, said surfaces being adapted to receive respective ones of a pair of tire rims to be mounted on the wheel.

2. A vehicle wheel as set forth in claim 1 wherein more abruptly axially outwardly turned portions are provided in said axially outwardly turned annular portion of said outer web, said more abruptly turned portions being spaced from each other circumferentially of said wheel and terminating in substantially plane, radially extending surfaces on the outer side of said outer web adjacent the outer peripheral cylindrical portion of said web, said surfaces to serve as seats for rim lugs for a rim.

3. A vehicle wheel as set forth in claim 1 wherein the outer peripheral cylindrical portion of said inner web is inclined correspondingly to said cylindrical element at said inclined surface thereof serving as a seat and support for said cylindrical element.

4. A vehicle wheel as set forth in claim 1 wherein said cylindrical element is provided with an integral cylindrical portion extending substantially axially inwardly of said inner web and braking means are secured to said integral portion.

CHARLES S. ASH.

REFERENCES CITED

The following references are of record in the file of this patent:

UNITED STATES PATENTS

| Number | Name | Date |
|---|---|---|
| 1,752,317 | Walther | Apr. 1, 1930 |
| 1,861,187 | Lofland | May 31, 1932 |
| 1,984,048 | Walther | Dec. 11, 1934 |
| 1,993,430 | Bell | Mar. 5, 1935 |
| 2,100,626 | Brink | Nov. 30, 1937 |
| 2,117,926 | Walther | May 17, 1938 |
| 2,355,942 | Ash | Aug. 15, 1944 |

FOREIGN PATENTS

| Number | Country | Date |
|---|---|---|
| 395,286 | France | 1909 |
| 18,287 | Australia | July 4, 1934 |